United States Patent Office 3,141,337
Patented July 21, 1964

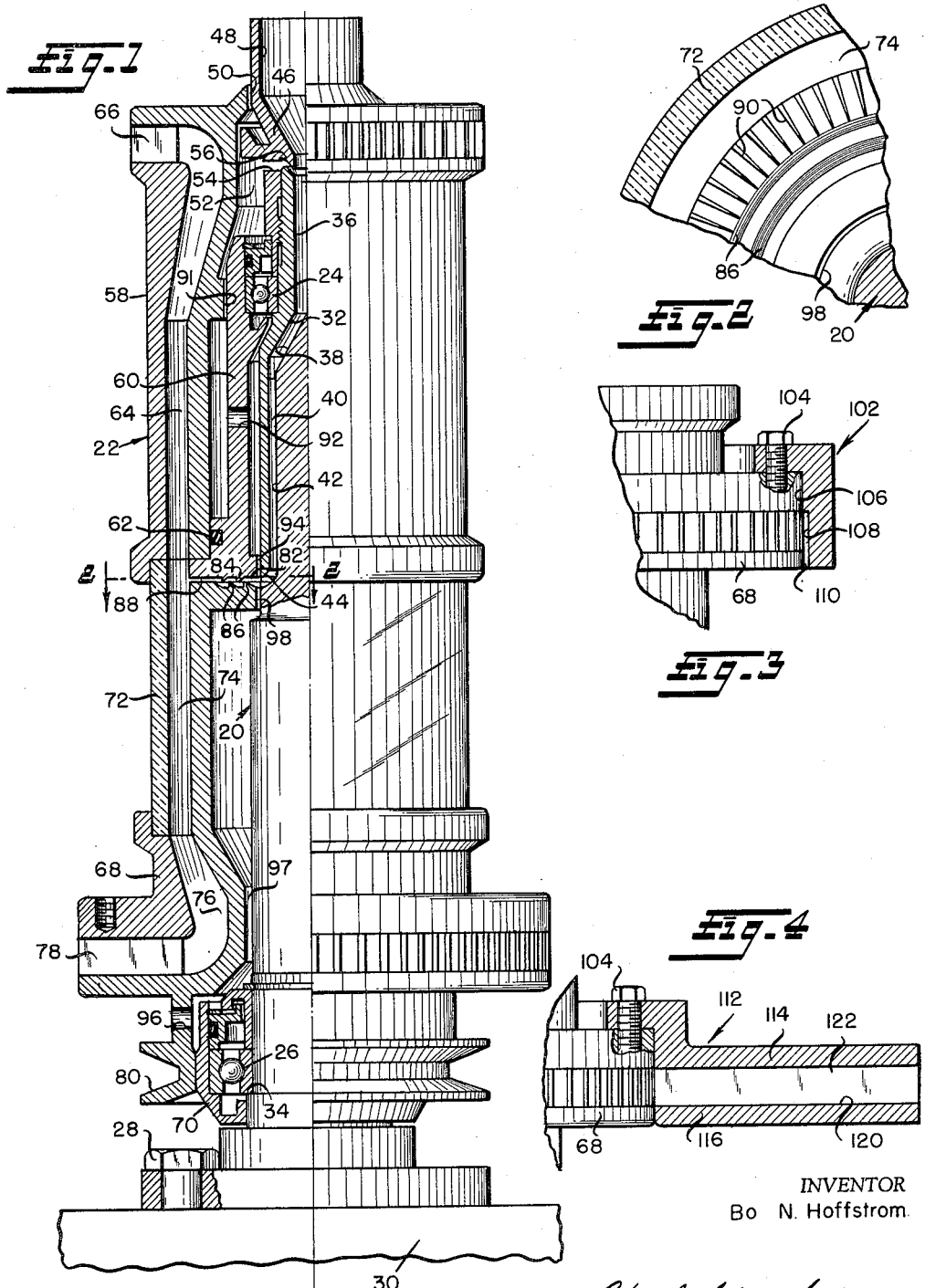

3,141,337
PARTICLE SIZE ANALYZER
Bo N. Hoffstrom, Santa Monica, Calif., assignor to Douglas Aircraft Company, Inc., Santa Monica, Calif.
Filed May 3, 1961, Ser. No. 107,447
6 Claims. (Cl. 73—432)

The present invention relates to apparatus for analyzing samples and more particularly to apparatus for determining the size distribution in a given sample of particles.

Particles of predetermined size either form an important ingredient or the end product of many industrial processes. To assure adequate quality control, it is necessary to determine at frequent intervals the size of the particles involved and the relative proportion of the total mass of particles which fall into a particular size group.

In the past, this type of analysis has been performed by permitting the particles to settle in a gravitational field. Since the settling velocity of particles varies with their size and specific weight, size and weight distribution of particles can be determined by visual observation. However the low settling velocity of very small particles and random disturbances such as convection currents in the fluid may upset the result, even to the point where it becomes useless, particularly for very small particles, i.e. below 50 microns. Accordingly, the success of prior apparatus has been dependent upon the maintenance of very carefully controlled conditions and the development of highly refined observation techniques.

It is the principal purpose and object of the present invention to provide improved apparatus for analyzing the size and weight distribution of particles which eliminates the disadvantages of the prior systems and which provides a uniformity and accuracy of result with a speed of operation not heretofore possible.

It is a further object of the present invention to provide improved apparatus of this type in which the range of size of the particles to be observed may be extended and adjusted easily as required to meet widely varying industrial requirements.

It is also an object of the present invention to provide improved apparatus of this type which is of relatively simple, compact and inexpensive construction and which may be operated by relatively unskilled personnel.

In carrying out these and other objects, the particles to be analyzed are fed in a thin sheet across a stream of fluid passing through a centrifugal field. The particles are moved by centrifugal force across the stream and are deposited on a wall at a distance from the feed line which is a direct function of their size and the stream velocity. The apparatus of the present invention is completely self-contained and includes means for establishing a flow of air or other fluid, subjecting this fluid to a centrifugal field of predetermined intensity, for feeding the particles into it, and for depositing the particles at an observation station.

Additional objects and advantages will become apparent as the description proceeds in connection with the accompanying drawings in which:

FIGURE 1 is a side view, partly in section and partly in elevation, of the preferred form of apparatus embodying the present invention;

FIGURE 2 is a transverse section taken along line 2—2 of FIGURE 1;

FIGURE 3 is a fragmentary vertical section showing the installation of an accessory; and FIGURE 4 is a fragmentary vertical section showing the installation of a second accessory.

Referring now more particularly to the drawings, the principal components of the apparatus of the present invention are a stationary spindle assembly indicated generally at 20 and a rotating housing indicated generally at 22 supported for rotation on the spindle 20 by upper and lower bearings 24 and 26. The spindle assembly 20 preferably extends vertically and is suitably anchored by bolts 28 to a rigid supporting surface 30. Adjacent its upper and lower ends, the spindle 20 is provided with shoulders 32 and 34 which support the bearings and the revolving housing against downward movement. At its upper end the spindle 20 is provided with a cylindrical bore 36, the bottom end of which is connected by a channel 38 to a vertically extending annular space 42 containing radial vanes 40, the bottom end of which is outwardly flared to form a throat 44.

An annular adapter member 46 is threaded to the outer surface of the upper end of the spindle and is provided at its upper end with a hopper section 48 into which the particles to be analyzed are fed. An annular passage 50 is formed between the outer surface of the hopper section 48 and the interior of the revolving housing 22 through which air flows successively into annular space 52 to radial openings 54 in the adapter 46 and into the bore 36 through an annular space 56 formed between the bottom end of the hopper section and the upper end of the fixed spindle section to facilitate the flow of the sample material downwardly through the spindle channels.

The revolving housing comprises an upper housing member 58 supported on a sleeve member 60 in turn supported on the upper bearing 24, the joint between the two parts being sealed and secured by an O-ring 62. An annular channel 64 extends from the bottom of the upper housing member 58 to a point adjacent the top of the member where it is directed radially outward and leads to the outer surface of the upper member through a series of radial blades 66. The lower portion of the revolving housing is formed by a base member 68, the lower end of which is slide-fitted onto adapter member 70 rotatably carried by the lower bearing assembly 26. A cylinder 72, preferably of glass, is clamped between the upper and lower housing members 58 and 68 and forms the outer wall of a vertical annular channel 74 which communicates at its upper end with the channel 64 and at its lower end with a channel 76 which is connected to the outer surface of the lower member 68 through a series of radial blades 78. While the rotating drive may be imparted to the housing in a variety of ways, preferably the housing is belt-driven, a pulley 80 being formed integrally with the lower housing member 68 for this purpose.

It will be noted that the parting line between the lower housing member 68 and the sleeve member 60 is opposite the mouth of the channel 42. In this area a radially extending channel 82 is formed by turning concentric circular recesses in the adjacent faces of each of the members, the outer edge of the recesses being formed by radially offset sets of lips 84 and 86, respectively. At its outer end the channel 82 is in communication with a straight walled channel 88 in which a plurality of very thin, closely spaced radial vanes 90 are positioned.

The vanes 90 are preferably of the configuration shown in FIGURE 2 and are formed by milling straight-walled slots in the upper end of housing member 68 or the lower end of sleeve 60.

The vanes 66 and 78 are preferably of the same configuration and are formed in the same manner in one of the adjacent members. The vertical edges of the blades are then cemented to the other adjacent member.

In operation the unit is rotated at any suitable speed which is usually in the range from 2000 r.p.m.–6000 r.p.m. Since the inner diameters of the upper and lower sets of blades 66 and 78 are the same and the tip diameter of the lower set of blades 78 is greater than the tip diameter of the upper set of blades 66, the lower set of blades act as a centrifugal pump drawing air inwardly through the blades 66 and downwardly through the channels 64 and 74. The upper blades 66 impart to the air the same rotational speed as the walls in the annular passages 64 and 74 so there is no relative circumferential motion between the walls of the channels 64 and 74 and the air.

The substantial length of the upper passage 64 is provided to eliminate or minimize turbulence in the air before it reaches the analyzing zone, the upper end of which is opposite the radial channel 88. The particles are fed into the hopper section 48 where they pass by gravity through the bore 36 and the channels 38 and 42 for exit through the throat 44. The passage of particles is assisted by the flow of air through the space 56 generated by the slight vacuum which is produced at all points in the apparatus upstream of the pump blades 78. This slight vacuum also sets up a barrier air flow from the upper and lower ends of the apparatus toward the throat 44, the latter flowing through the space 50, a vaned clearance space 91, radial openings 92 in the sleeve 60 and a clearance space 94 formed between the lower end of the sleeve 60 and the outer surface of the stationary spindle 20. The flow of barrier air from the lower end of the mechanism proceeds through openings 96 in the lower housing member 68 and through restricted clearance spaces 97 and 98 between the inner surfaces of the lower housing member 68 and the outer surface of the stationary spindle assembly 20. The barrier air flow prevents the particles from dropping into the clearance spaces necessarily provided at the throat 44.

As the particles are delivered from the throat 44 into the channel 82, they pass progressively outward, the concentric ribs 84 and 86 serving to distribute the particles evenly around the apparatus before they enter the blades 90 through which the particles pass into the upper end of the analyzing zone. Here the particles are intercepted by the annular stream of air moving downwardly through the zone.

All of the particles pass radially outward through the analyzing zone and impinge against the inner surface of the glass cylinder 72. The particles will be distributed on this surface in accordance with their size and specific weight. Thus, if the sample is homogeneous, the particles in the sample are distributed according to size axially along the glass cylinder, the density of particles at any one height indicating the frequency of the corresponding size in the original sample. The largest particles are deposited on the inner surface of the glass wall 72 adjacent the top thereof and the finer particles are deposited in regions further down along the inner surface of the glass.

The result is a spectrum similar to that obtained by conventional light spectograph but showing particle size distribution instead of wave lengths. The character of the spectrum is such that finer particles which normally appear in greater numbers are spread relatively further apart than are the coarser particles.

With some training, an operator should be able to judge a sample merely by visual inspection of the glass cylinder, particularly in cases of repetitive tests, for example in connection with process control. However to facilitate the closer analysis, the inner surface of the cylinder 72 may be coated with a suitable substance or lined with a film to retain the particles in their distributed position. Also a permanent record may be made by installing a strip of tape on the interior of the cylinder 72, the tape being coated with a tacky substance to retain the particles. The absolute determination of size and frequency of the particles is best done with a microscope or on microphotographs. This is comparatively easy because of the precise separation of the particles produced by the application of high centrifugal forces to them.

The process of depositing the sample takes only a few seconds. After the apparatus is stopped, the top cover member 58 and the cylinder 72 may be lifted off to permit detailed study of the inner surface of the cylinder 72 if this is necessary. It is a feature of the invention that special tools and techniques are not necessary to effect this minor disassembly of the apparatus since the parts are held together by centrifugal force on the O-ring 62 when the apparatus is running, and this force, which is the sole locking force holding the parts in assembled position, is automatically removed when the apparatus is at rest. The apparatus of the present invention can be conveniently sized to be most effective for the particle size range of particular interest in any given application. For example, a unit having a diameter of six inches and a height of approximately 16 inches operated at a speed of approximately 6000 r.p.m. provides precise analysis of particles ranging in size from 5 to 75 microns, assuming the particles have a specific gravity of about 2.8.

The range of the basic unit can be adjusted up or down by simple accessories which increase or decrease the through air flow. For example, the range of particle size can be lowered by installing an annular throttle ring 102 over the outlet blades 78 to thereby reduce the flow of air through the apparatus shown in FIGURE 3. The throttle ring 102 is L-shaped in section and is detachably secured to the member 68 by a plurality of screws 104. The upper inner surface 106 of the cylindrical wall portion of the throttle ring is in close clearance relation with the outer periphery of the member 68. The inner surface of the annular wall portion is cut away as at 108 opposite the outlet ends of blades 78 to provide a restricted annular flow channel 110, the radial width of which can be carefully controlled to provide the desired degree of flow restriction in this area.

In a specific case, by means of this simple accessory, the range can be changed from 5 to 75 microns to from 0.25 to 25 microns. Conversely, the range of the apparatus may be raised by the addition of the auxiliary fan unit 112 shown in FIGURE 4 to increase the air flow through the apparatus.

The auxiliary fan unit 112 is of annular configuration and is detachably secured to the member 68 by the bolts 104, and is provided with top and bottom wall portions 114 and 116 which form an annular channel 120. Flat radial blades 122 extend across channel 120 in radial alignment with the outlet ends of the blades 78 and are cemented to the upper and lower wall portions 114 and 116. In effect, this unit extends the length of blades 78 to increase the flow of air through the apparatus to any desired extent. With the addition of such a fan, the apparatus will provide precise analysis of particles in the range of from 25 to 250 microns. Thus the total size range may be extended about 1:1000 compared to the basic range of 1:25.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. Apparatus for analyzing the size of particles in a given sample comprising a rotor forming a longitudinally extending channel having opposed walls, means for rotating said rotor and establishing a stream of fluid flowing axially through said channel, said fluid moving at essentially the same circumferential velocity as said rotor, means for injecting said particles into said channel through one wall thereof transversely of said channel intermediate the ends of said channel with essentially the same rotary velocity as said fluid and with sufficient radial velocity to cause said particles to impinge on the opposite wall of said channel whereby the coarse particles will be moved a predetermined distance axially of said channel by said stream of fluid and the finer particles will be moved a greater distance axially of said channel for deposit on said opposite wall at axially spaced locations.

2. The apparatus according to claim 1 wherein said opposite wall is formed of a transparent material to facilitate visual inspection of said particles.

3. The apparatus according to claim 1 together with a particle retaining coating covering at least a portion of the inner surface of said opposite wall.

4. Apparatus for analyzing the size of particles in a given sample comprising a stationary spindle of essentially cylindrical form having an axial inlet for said particles at its upper end and a radial outlet for said particles intermediate its ends, a rotor assembly mounted for rotation on said spindle, means forming an axially extending channel in said rotor assembly having opposed inner and outer walls, a plurality of radially extending blades in the inlet and outlet ends of said channel for establishing a stream of fluid flowing axially through said channel, said fluid moving at essentially the same rotary velocity as said rotor, means in said rotor for moving said particles through the outlet of said spindle and for injecting said particles into said channel intermediate the ends of said channel through the inner wall thereof transversely of said channel with essentially the same rotary velocity as said fluid and with sufficient radial velocity to cause said particles to impinge on the outer wall of said channel whereby the coarse particles will be moved a predetermined distance axially of said channel by said stream of fluid and the finer particles will be moved a greater distance axially of said channel for deposit on said outer wall at axially spaced locations.

5. The apparatus according to claim 4 wherein said outer wall is formed of a transparent material to facilitate visual inspection of said particles.

6. Apparatus for analyzing the size of particles in a given sample comprising a stationary spindle of essentially cylindrical form having an axial inlet for particles at its upper end and a radial outlet for said particles intermediate its ends, a rotor assembly mounted for rotation on said spindle, means forming an axially extending channel in said rotor assembly having opposed inner and outer walls, means for establishing a stream of fluid flowing axially through said channel, said fluid moving at essentially the same rotary velocity as said rotor, means in said rotor for moving said particles through the outlet of said spindle and for injecting said particles into said channel through the inner wall thereof transversely of said channel with essentially the same rotary velocity as said fluid and with sufficient radial velocity to cause said particles to impinge on the outer wall of said channel whereby the coarse particles will be moved a predetermined distance axially of said channel by said stream of fluid and the finer particles will be moved a greater distance axially of said channel for deposit on said outer wall at axially spaced locations.

References Cited in the file of this patent

UNITED STATES PATENTS

| 2,593,294 | Goldberg | Apr. 15, 1952 |
| 2,817,970 | Whitby | Dec. 31, 1957 |

FOREIGN PATENTS

| 791,845 | Great Britain | Mar. 12, 1958 |

OTHER REFERENCES

Publication: APCA Journal, vol. 10, pages 378–383, 414, 416, Oct. 1960, article by Goetz et al.